(12) United States Patent
Bates et al.

(10) Patent No.: US 7,076,546 B1
(45) Date of Patent: Jul. 11, 2006

(54) BROWSER FOR USE IN ACCESSING HYPERTEXT DOCUMENTS IN A MULTI-USER COMPUTER ENVIRONMENT

(75) Inventors: Cary Lee Bates, Rochester, MN (US); Jeffrey Michael Ryan, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/247,502

(22) Filed: Feb. 10, 1999

(51) Int. Cl.
*G06F 15/173* (2006.01)

(52) U.S. Cl. .................. 709/224; 709/223; 709/205; 715/513; 715/514; 715/745

(58) Field of Classification Search .............. 725/51; 709/204–207, 217, 218, 228, 245, 223, 200, 709/224–229; 715/501.1, 513–515, 745, 715/738, 526; 345/339; 707/500
See application file for complete search history.

(56) References Cited

U.S. PATENT DOCUMENTS

| | | | |
|---|---|---|---|
| 5,764,908 A | | 6/1998 | Shoji et al. |
| 5,949,891 A | * | 9/1999 | Wagner et al. .............. 381/98 |
| 5,956,491 A | * | 9/1999 | Marks .......................... 709/250 |
| 5,983,270 A | * | 11/1999 | Abraham et al. ............ 709/224 |
| 6,020,884 A | * | 2/2000 | MacNaughton et al. .... 345/747 |
| 6,029,195 A | * | 2/2000 | Herz ............................ 725/116 |
| 6,049,777 A | * | 4/2000 | Sheena et al. ............... 705/10 |
| 6,061,716 A | * | 5/2000 | Moncreiff .................... 345/753 |
| 6,131,110 A | * | 10/2000 | Bates et al. .................. 709/203 |
| 6,138,128 A | * | 10/2000 | Perkowitz et al. .......... 715/501.1 |
| 6,182,142 B1 | * | 1/2001 | Win et al. .................... 709/229 |
| 6,211,877 B1 | * | 4/2001 | Steele et al. ................ 345/804 |
| 6,212,548 B1 | * | 4/2001 | DeSimone et al. ......... 709/204 |
| 6,240,443 B1 | * | 5/2001 | Suzuki et al. ............... 709/204 |
| 6,249,795 B1 | * | 6/2001 | Douglis ........................ 715/511 |
| 6,269,369 B1 | * | 7/2001 | Robertson ................... 707/10 |

(Continued)

OTHER PUBLICATIONS

"Chat Comp: Lobby", Yahoo!, http://chat.yahoo.com, downloaded Nov. 18, 1998.*
"Help—Chat: HTML Chat Guide", *Yahoo!*, http://help.yahoo.com/help/cht/chtml/chtml–04.html, downloaded Nov. 18, 1998, (1 page).
"Profiles", *Yahoo!*, http://profiles.yahoo.com/wheresoz, (Nov. 9, 1998), downloaded Nov. 18, 1998, (1 page).
"Chat Comp: Lobby", *Yahoo!*, http://chat.yahoo.com/, downloaded Nov. 18, 1998; (1 page).
"Help—Chat: HTML Chat Guide", *Yahoo!*, http://help.yahoo.com/help/chat/chtml/chtml–03.html, downloaded Nov. 18, 1998, (1 page).
Blaxxum Ccpro Shareware & PD Communication dated Dec. 1998, p. 119.
ICQ Panels Generator, URL http:\\web.archive.org\web\20000831165807\icq.com\panels.

*Primary Examiner*—William C. Vaughn, Jr.
*Assistant Examiner*—David England
(74) *Attorney, Agent, or Firm*—Wood, Herron & Evans

(57) ABSTRACT

An apparatus, program product, and method that track where particular users are browsing within a multi-user computer environment, and provide such information to one or more users within the environment to permit greater interactivity among the users. By enabling users to identify and interact with other users in a browsing environment, users may be permitted to access lists of favorite documents, home pages, navigational histories, etc. of other users while browsing to facilitate the dynamic location and retrieval of useful information. Also, users may be permitted to directly communicate with one another while browsing, e.g., via electronic messages, real-time discussions, etc.

28 Claims, 8 Drawing Sheets

U.S. PATENT DOCUMENTS 6,314,425 B1 * 11/2001 Serbinis et al. ............... 707/10
6,333,787 B1 * 12/2001 Konno ..................... 358/1.13
6,366,947 B1 *  4/2002 Kavner ...................... 709/203
6,421,726 B1 *  7/2002 Kenner et al. ............. 709/225
6,430,567 B1 *  8/2002 Burridge .................... 707/102
6,557,015 B1 *  4/2003 Bates et al. .............. 715/501.1
6,557,028 B1 *  4/2003 Cragun ...................... 709/205
6,832,350 B1 * 12/2004 Bates et al. .............. 715/501.1

* cited by examiner

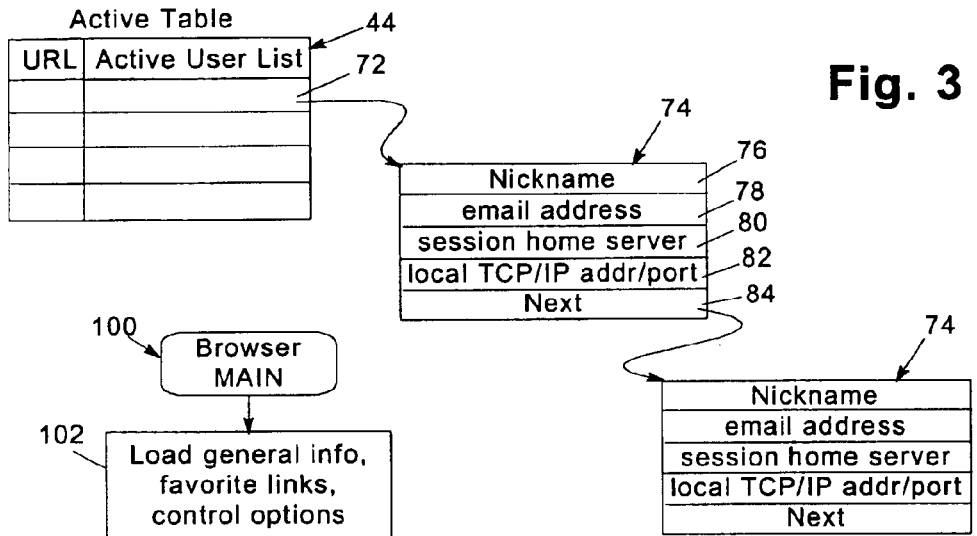
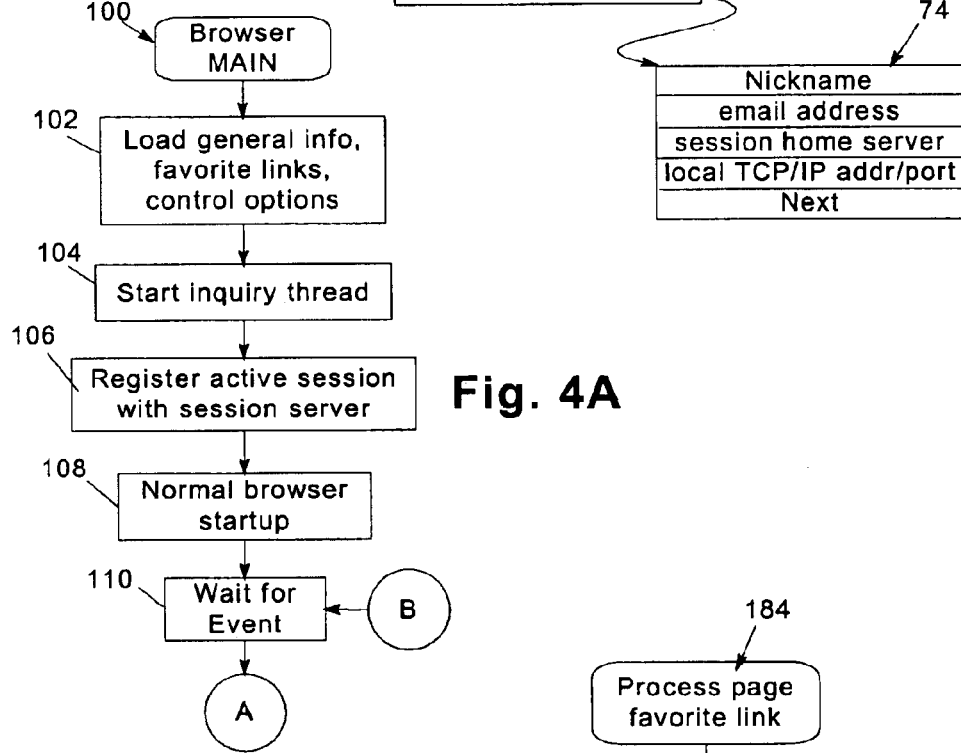
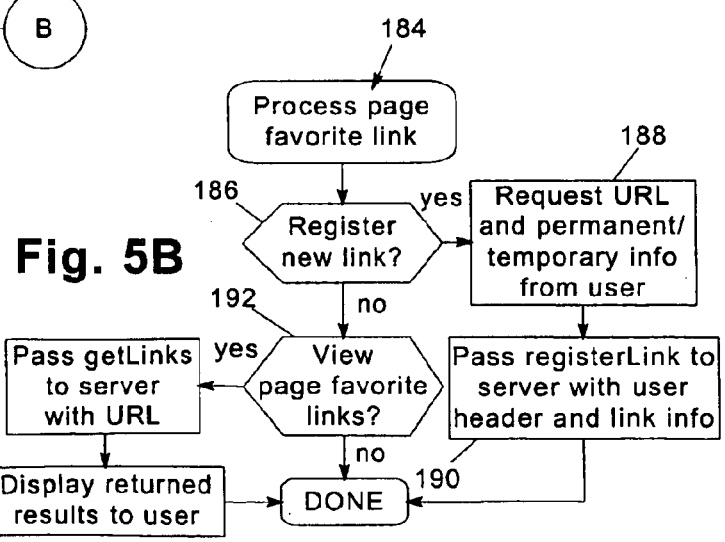
Fig. 3
Fig. 4A
Fig. 5B

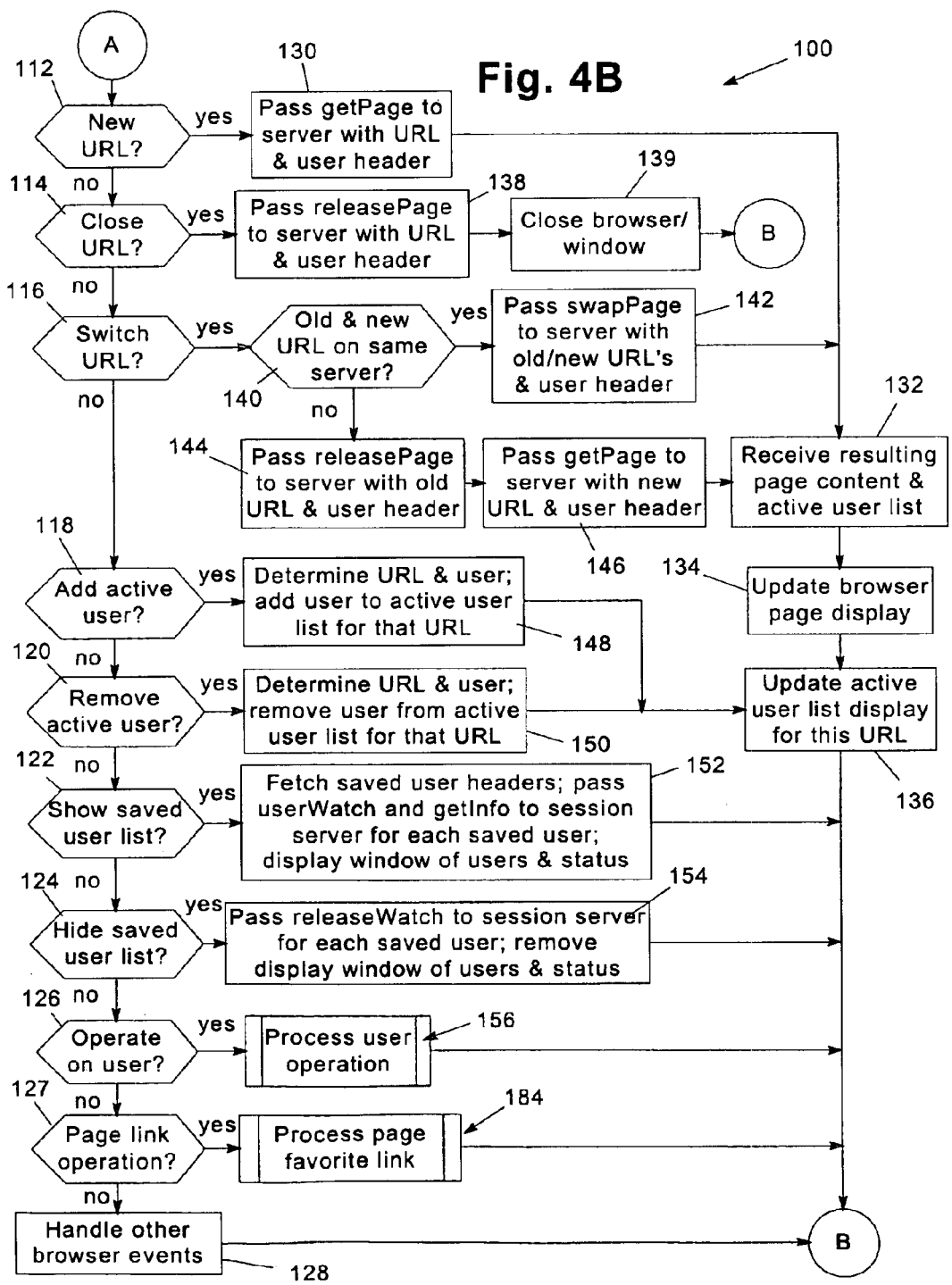

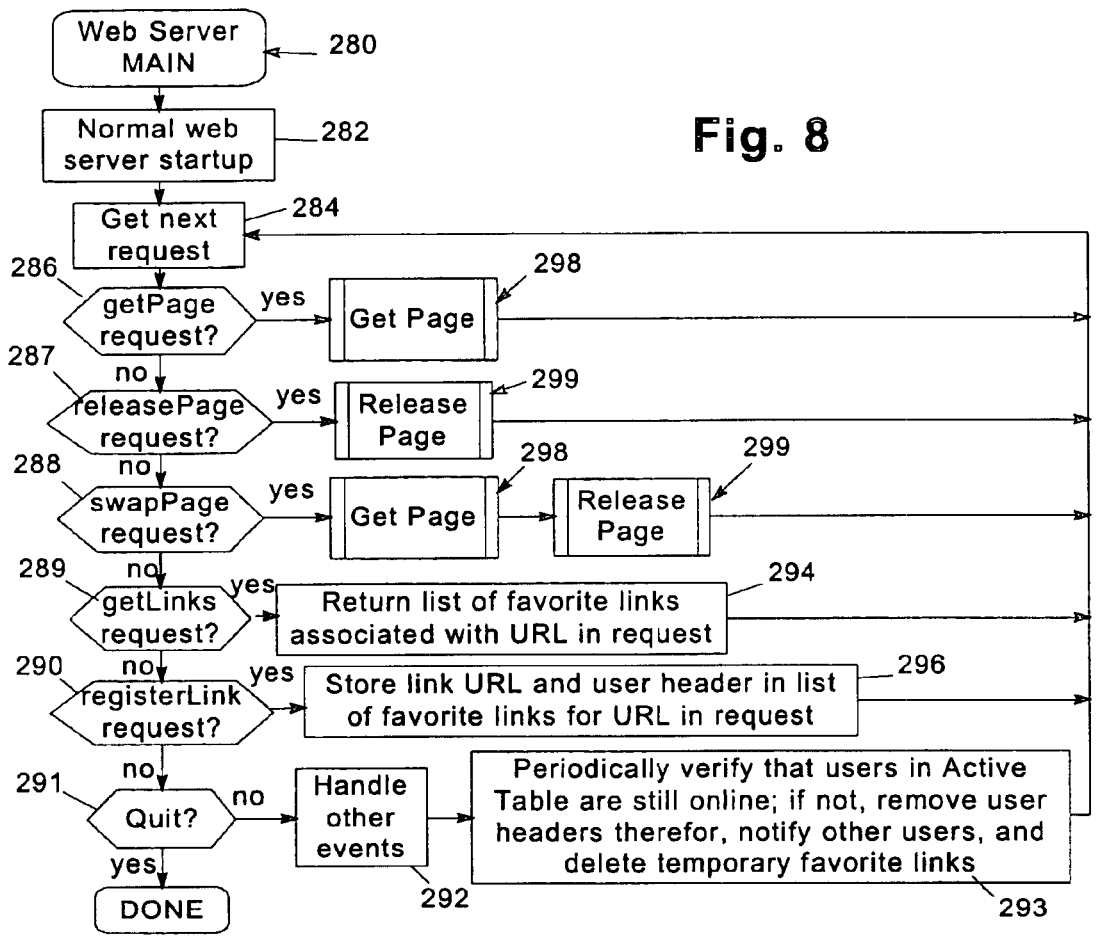
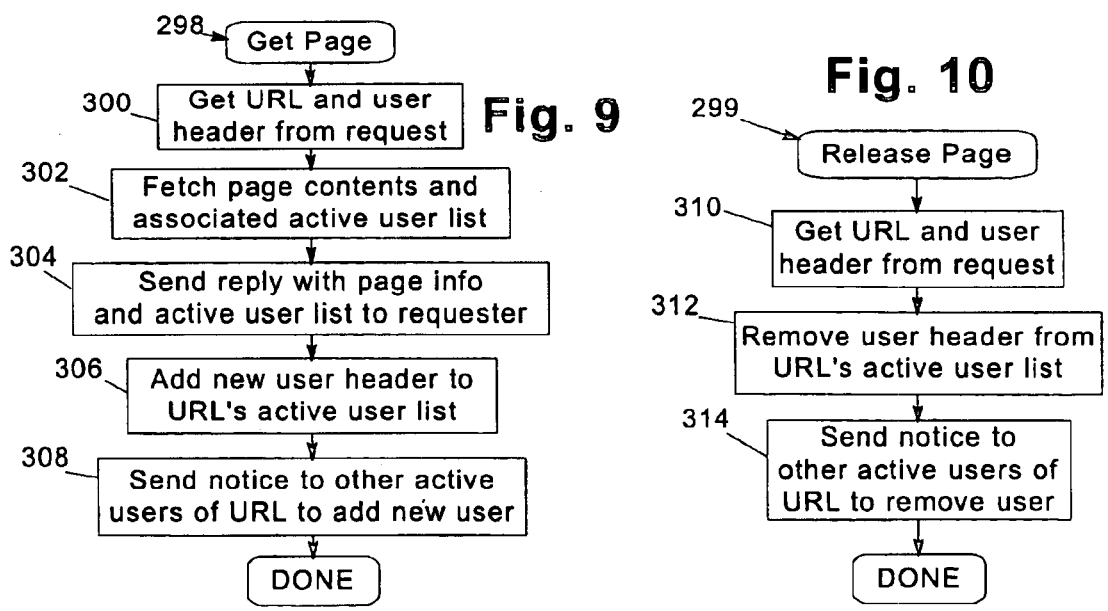

BROWSER FOR USE IN ACCESSING HYPERTEXT DOCUMENTS IN A MULTI-USER COMPUTER ENVIRONMENT

FIELD OF THE INVENTION

The invention is generally related to computers and computer software. More specifically, the invention is generally related to the display of and navigation between hypertext documents with browser computer programs and the like.

BACKGROUND OF THE INVENTION

Due to advances in computer and networking technology, the amount and variety of information that can be accessed through a computer continues to increase at an astounding rate. The Internet, in particular, has enabled computer users to access a wide variety of information from computers located all over the world.

As more and more computer users connect to networks such as the Internet, an astounding societal shift has occurred. Computer users, though physically separated from one another in different cities or states, or even on different continents, can now be linked together electronically to form a truly global community, commonly referred to as "cyberspace". Within such a community, users have a need to interact with one another, and this desire for interaction has been one of the predominant forces driving the growth of the Internet.

Users are presented with a number of technologies for interacting with one another over a network. Electronic messaging, also referred to as "email", enables users to send messages to one another much like one would send a paper letter to another person through regular postal service. Electronic bulletin boards permit users to post messages that can be read by anyone having access to the boards. Real-time discussion forums, also referred to as "chat rooms", extend the concepts of electronic bulletin boards to permit users to view messages sent by other users in real time, i.e., while those messages are being typed. Groupware systems permit users to share information and work together as a group to further common goals, e.g., to permit users to collectively create documents and share comments about those documents.

Unlike the above-described network-based tools, conventional web browsers offer comparatively less interaction between users. Web browsers are typically used to access and view information stored on a segment of the Internet known as the World Wide Web. Such information is typically stored on the World Wide Web in the form of hypertext documents, which are typically collections of information formatted in a language known as the Hypertext Markup Language (HTML). Also, due to the immense popularity of the World Wide Web, many private networks also store information in the form of hypertext documents.

Practically any information can be represented in a hypertext document, whether represented as text, graphics, video, sound, animation, etc. However, given the vast resources available on the Internet and within private networks, it is often difficult for users of web browsers to locate useful hypertext documents, and thus useful information, without significant effort. Over time, a user may eventually gain a degree of expertise in locating information about a particular topic; however, whenever a user is first attempting to locate information about a new topic, the user often must weed through an extensive amount of unrelated and useless information before potentially valuable information is found.

Other users may have invested similar resources in developing an expertise in a particular topic, and it could be extremely helpful for new users to be able to benefit from those other users' past efforts to accelerate the development of their own expertise in the topic. However, with conventional web browsers, little or no collaboration features are supported to permit users to share resources as with other network-based collaboration tools.

More enterprising individuals may develop their own personal web sites if they have an interest in a particular topic, and may include a list of "hot links" that point to related hypertext documents containing potentially useful information on that topic. However, other users must first know where that user's web site is located to access hot links. Also, to be valuable, the owner of the web site must take the initiative to develop the web site and continuously update it over time to incorporate new useful information.

Another form of collaboration available to users of web browsers is HTML-based chat. Similar to non-HTML chat systems, HTML-based chat systems permit users to participate in ongoing on-line discussions in real time. An HTML-based chat system, however, differs from non-HTML chat systems in that the system generates and transmits chat session scripts as HTML documents, thus permitting users to access the scripts via a web browser, rather than through other dedicated software. With such a system, users are typically capable of participating in chat discussions, and are often permitted to retrieve profile information about other participating users such as their favorite links, home pages, personal information, etc.

However, viewing scripts from HTML-based chat systems is not particularly analogous to web browsing, since the content of the displayed scripts is dictated by the participants of the chat, instead of the author of a hypertext document. Chat scripts are also dynamic, and changing over time, rather than being preexisting and static like many hypertext documents. Furthermore, simply viewing a chat script typically modifies the script, since the addition or removal of a viewer of a chat script is typically reflected in the text of the script. Moreover, on-line chat systems typically require both the chat management and the document generation and transmission functions to be tightly integrated into a single application, which makes such systems impractical for viewing hypertext documents distributed throughout different locations on the Internet.

As a result, web browsing to date remains more or less a solitary activity, devoid of much of the interactivity supported by other network-based applications. Whereas conventional network-based applications permit users to share ideas and collaborate, users of web browsers are left on their own to plod through all of the resources on the Internet to locate potentially useful information. Considering the ever-present desire for more user interaction in cyberspace, the lack of interactivity supported by conventional web browsers often significantly limits user enjoyment and productivity. Therefore, a significant need exists for expanding the interactivity of web browsing over that supported by conventional web browsers and the like.

SUMMARY OF THE INVENTION

The invention addresses these and other problems associated with the prior art by providing an apparatus, program product, and method that track where particular users are browsing within a multi-user computer environment, and provide such information to one or more users within the environment. For example, in certain embodiments of the invention, interaction between users may supported to facilitate the dynamic location and retrieval of useful information, e.g., by permitting users to access lists of favorite documents, home pages, navigational histories, etc. of other users while browsing. Certain embodiments may also enhance user interaction by permitting users to directly communicate with one another while browsing, e.g., via electronic messages, real-time discussions, etc. As such, web browsing can be transformed from a relatively solitary activity to a more interactive forum through which users are able to collaborate with one another and build on others' developed expertise to locate desirable information about a particular topic.

Consistent with one aspect of the invention, access to hypertext documents in a multi-user computer environment is provided by tracking accesses to at least one hypertext document by a plurality of users including first and second users, and notifying the first user of the identity of the second user. Consistent with another aspect of the invention, access to hypertext documents in a multi-user computer environment is provided by tracking which of a plurality of hypertext documents a first user is currently viewing, and communicating to a second user a copy of the hypertext document currently being viewed by the first user.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 3 is a block diagram of the active table data structure used in the client computer of FIG. 2.

FIGS. 4A and 4B are flowcharts illustrating the program flow of a main routine for the browser of FIG. 2.

FIGS. 5A and 5B are flowcharts respectively illustrating the program flows of the process user operation and process page favorite link routines of FIG. 4B.

FIG. 8 is a flowchart illustrating the program flow of a main routine for the web server of FIG. 2.

FIG. 9 is a flowchart illustrating the program flow of the get page routine of FIG. 8.

FIG. 10 is a flowchart illustrating the program flow of the release page routine of FIG. 8.

DETAILED DESCRIPTION

Hardware and Software Environment

Figure 1:
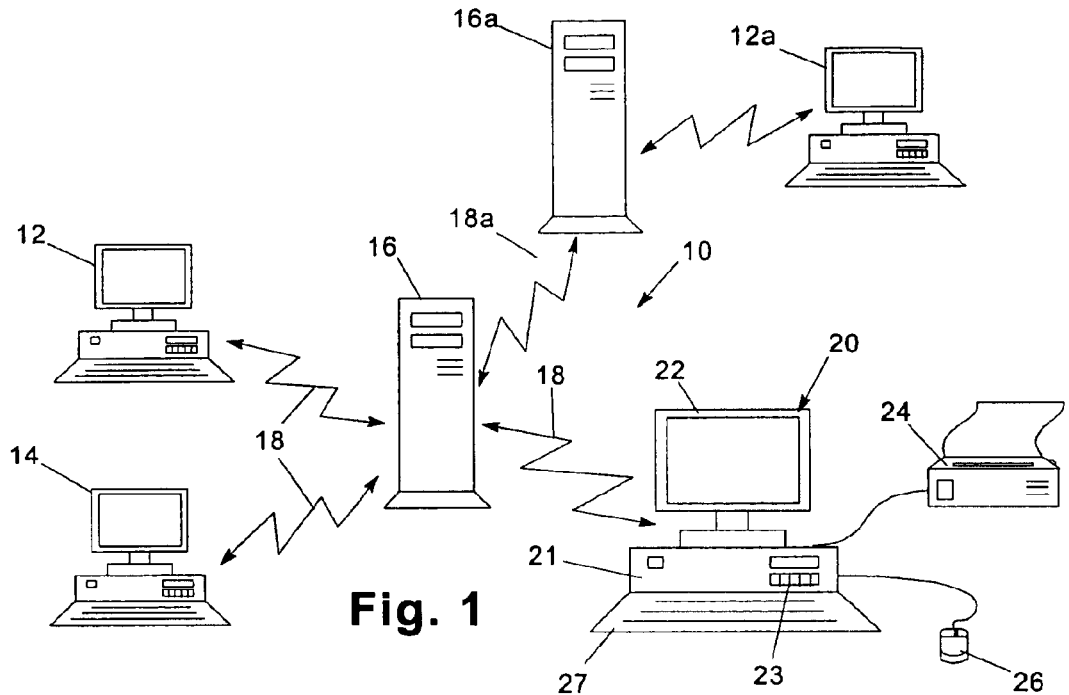
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system that defines a multi-user computer environment, and that includes one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Also illustrated is an additional server 16a interfaced with server 16 over a network 18a, and to which is coupled a client computer 12a. Networks 18 and 18a may represent practically any type of networked interconnection, including but not limited to local-area, wide-area, wireless, and public networks (e.g., the Internet). Moreover, any number of computers and other devices may be networked through networks 18, 18a, e.g., additional client computers and/or servers.

Client computer 20, which may be similar to computers 12, 12a and 14, includes a central processing unit (CPU) 21; a number of peripheral components such as a computer display 22; a storage device 23; a printer 24; and various input devices (e.g., a mouse 26 and keyboard 27), among others. Server computers 16, 16a may be similarly configured, albeit typically with greater processing performance and storage capacity, as is well known in the art.

Figure 2:
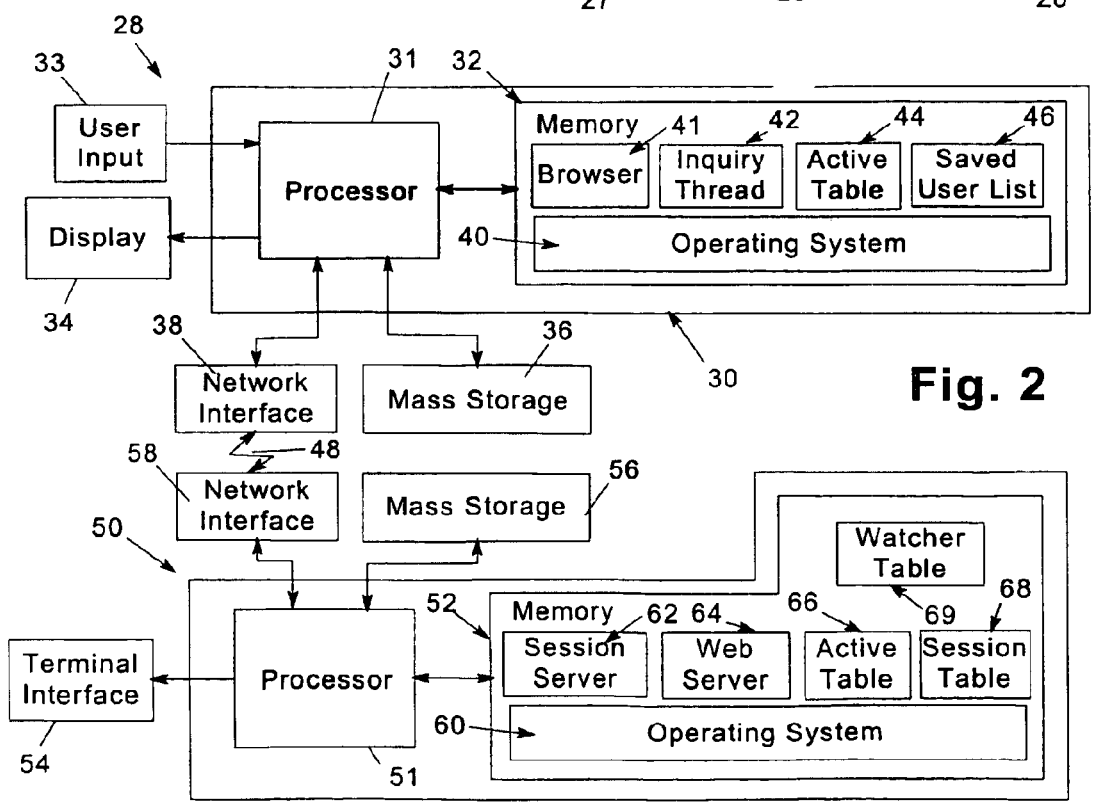
FIG. 2 is a block diagram of an exemplary hardware and software environment for the networked computer system of FIG. 1.

FIG. 2 illustrates in another way an exemplary hardware and software environment for networked computer system 10, including an apparatus 28 which includes a client apparatus 30 interfaced with a server apparatus 50 via a network 48. For the purposes of the invention, client apparatus 30 may represent practically any type of computer, computer system or other programmable electronic device capable of operating as a client, including a desktop computer, a portable computer, an embedded controller, etc. Similarly, server apparatus 50 may represent practically any type of multi-user or host computer system. Each apparatus 28, 30 and 50 may hereinafter also be referred to as a "computer" or "computer system", although it should be appreciated the term "apparatus" may also include other suitable programmable electronic devices consistent with the invention.

Computer 30 typically includes at least one processor 31 coupled to a memory 32, and computer 50 similarly includes at least one processor 51 coupled to a memory 32. Each processor 31, 51 may represent one or more processors (e.g., microprocessors), and each memory 32, 52 may represent the random access memory (RAM) devices comprising the main storage of the respective computer 30, 50, as well as any supplemental levels of memory, e.g., cache memories, non-volatile or backup memories (e.g., programmable or flash memories), read-only memories, etc. In addition, each memory 32, 52 may be considered to include memory storage physically located elsewhere in the respective computer 30, 50, e.g., any cache memory, or any storage capacity used as a virtual memory such as in a mass storage device or on another computer coupled to the respective computer 30, 50 via an external network.

Each computer 30, 50 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). Likewise, user interface with computer 50 is typically handled via a terminal coupled to a terminal interface 54.

For additional storage, each computer 30, 50 may also include one or more mass storage devices 36, 56, e.g., a floppy or other removable disk drive, a hard disk drive, a direct access storage device (DASD), an optical drive (e.g., a CD drive, a DVD drive, etc.), and/or a tape drive, among others. Furthermore, each computer 30, 50 may include an interface with one or more networks via a network interface 38, 58 (e.g., a LAN, a WAN, a wireless network, and/or the Internet, among others) to permit the communication of information with other computers coupled to the network.

Computer 30 operates under the control of an operating system 40, and executes or otherwise relies upon various computer software applications, components, programs, objects, modules, data structures, etc. (e.g., browser 41, inquiry thread 42, active table 44 and saved user list 46). Likewise, computer 50 operates under the control of an operating system 60, and executes or otherwise relies upon various computer software applications, components, programs, objects, modules, data structures, etc. (e.g., session server 62, web server 64, active table 66, session table 68 and watcher table 69). Moreover, various applications, components, programs, objects, modules, etc. may also execute on one or more processors in another computer coupled to either of computers 30, 50, e.g., in a distributed or client-server computing environment.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Interactive Browsing

The illustrated embodiments of the invention generally operate by tracking where different users in a multi-user computer environment are currently browsing—typically based upon the last hypertext document accessed by such users. In the illustrated embodiments, such tracking is handled by one or more session servers interfaced with one or more web servers, and typically distributed among one or more server computers to which multiple users to be tracked are connected. Each user wishing to retrieve tracking information about other users does so through interaction between the user's browser and the session and web servers comprising the browsing "backbone" for the multi-user environment.

While in some implementations all of the hypertext documents themselves may be stored in the web servers comprising the browsing backbone of the multi-user environment, it is often desirable for at least a portion of the hypertext documents being tracked in the environment to be located on other computers, e.g., coupled to a web server over the Internet. This permits, for example, a web server to be implemented in a proxy server, firewall, or other local server for a private network that functions as a gateway to an external network such as the Internet, with the status of different users being tracked even when the users are viewing documents stored externally from the private network.

To track individual users, each user to be tracked has associated therewith a user header. FIG. 3 illustrates, for example, one suitable data structure organization for active table 44 used by a user's browser to store information about other users currently browsing the same hypertext document. Table 44 includes a plurality of entries 72, each tagged with a particular Uniform Resource Locator (URL) that identifies a given hypertext document. Stored within each entry 72 is a pointer to a linked list of user headers 74 identifying particular users currently browsing the hypertext document located at the URL stored in the entry.

Each user header is implemented as a record including a number of fields that supply necessary information about a particular user, including a nickname field 76, an email address field 78, a session home server 80 (for use in multi-server environments), a local TCP/IP address/port field 82 (for identifying the precise location of the user in the multi-user environment). A next field 84 is also included to point to the next record (if any) in the linked list. The next field 84 in the last record in the linked list typically includes a NULL value.

It should be appreciated that the other tables in apparatus 28 also utilize the same user header records 74 as table 44. For example, active table 66 is similarly configured to table 44, and is used to maintain a list of users for each document, also referred to as a URL, maintained by the web server.

Moreover, session table 68 and watcher table 69, which are used by the session server, also rely on user header records 74, albeit with entries indexed by the email address or another identifier for each user associated with a particular user header. The session table is used by a session server to maintain a list of all users currently online for that server, typically with each entry in the table indexed by the email address of an online user, and with the user header therefor stored in the entry. The watcher table is used by a session server to maintain a list of users that are currently watching other users, with each entry in the table indexed by the email address of the person being watched, and with the user header of each user registered to watch that particular user being stored in the entry.

It should also be appreciated that other information may also be included within each user header record 74, and that some of the information noted above may be omitted in some embodiments. Furthermore, other data structures may be used for any of tables 44, 66, 68 and 69 or for various user headers 74.

In the embodiment discussed hereinafter, it is assumed that multiple session and web servers are distributed throughout a multi-user computer environment, and that a plurality of browsers, operated by different users, interact with such servers. Each user, and thus each browser, is associated with a "home" session server, with the multiple session servers communicating with one another to maintain coherence throughout the multi-user computer environment. In the alternative, a single session server may be used, which typically would simplify a number of management operations over a multi-server design. Moreover, it is possible in some implementations to integrate the functionality of the web and session servers into the same application.

Also in the embodiment discussed hereinafter, it is assumed that the various browsers, session servers and web servers interface with one another via messages, e.g., via passing events or objects therebetween. It should be appreciated, however, that other known manners of interfacing different computer applications with one another in a distributed environment may also be used in the alternative.

In addition, the discussion hereinafter may refer to a browser and its associated user interchangeably as a user will typically use the same browser on the same client computer, and thus users and browsers often map one-to-one with one another. In the alternative, however, it should be appreciated that a browser may support more than one user, and a user may rely on more than one browser and/or client computer. Thus, it may be desirable in some implementations to permit a user to "login" with a browser so that configuration and identification for a particular user may be retrieved by the browser and thereby configure the browser to operate on behalf of and under the control of a particular user.

Figure 6:
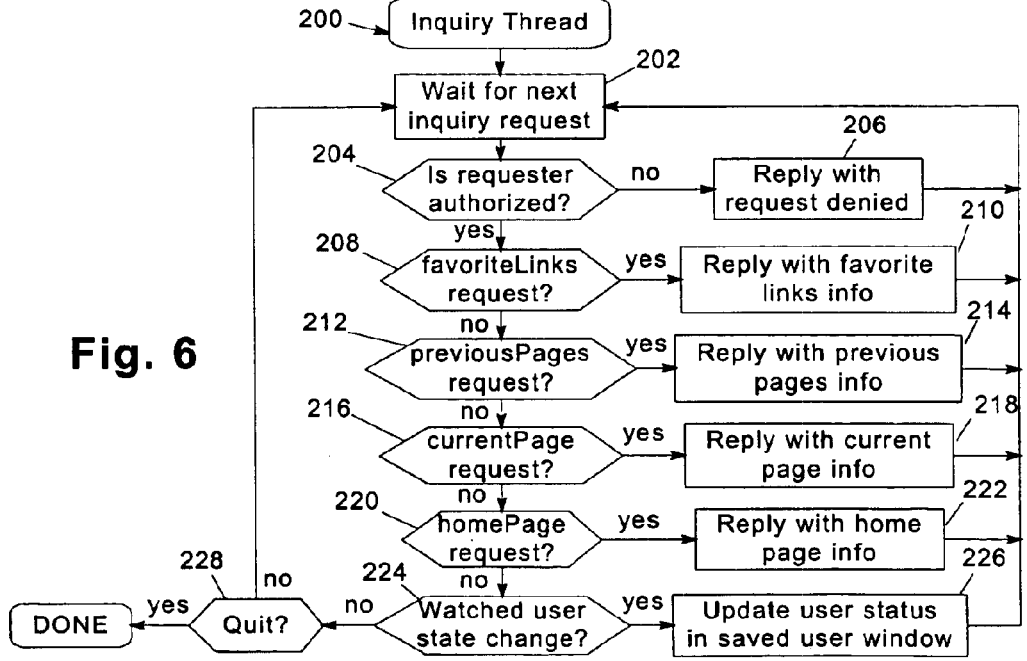
FIG. 6 is a flowchart illustrating the program flow of the inquiry thread of FIG. 2.
Figure 7:
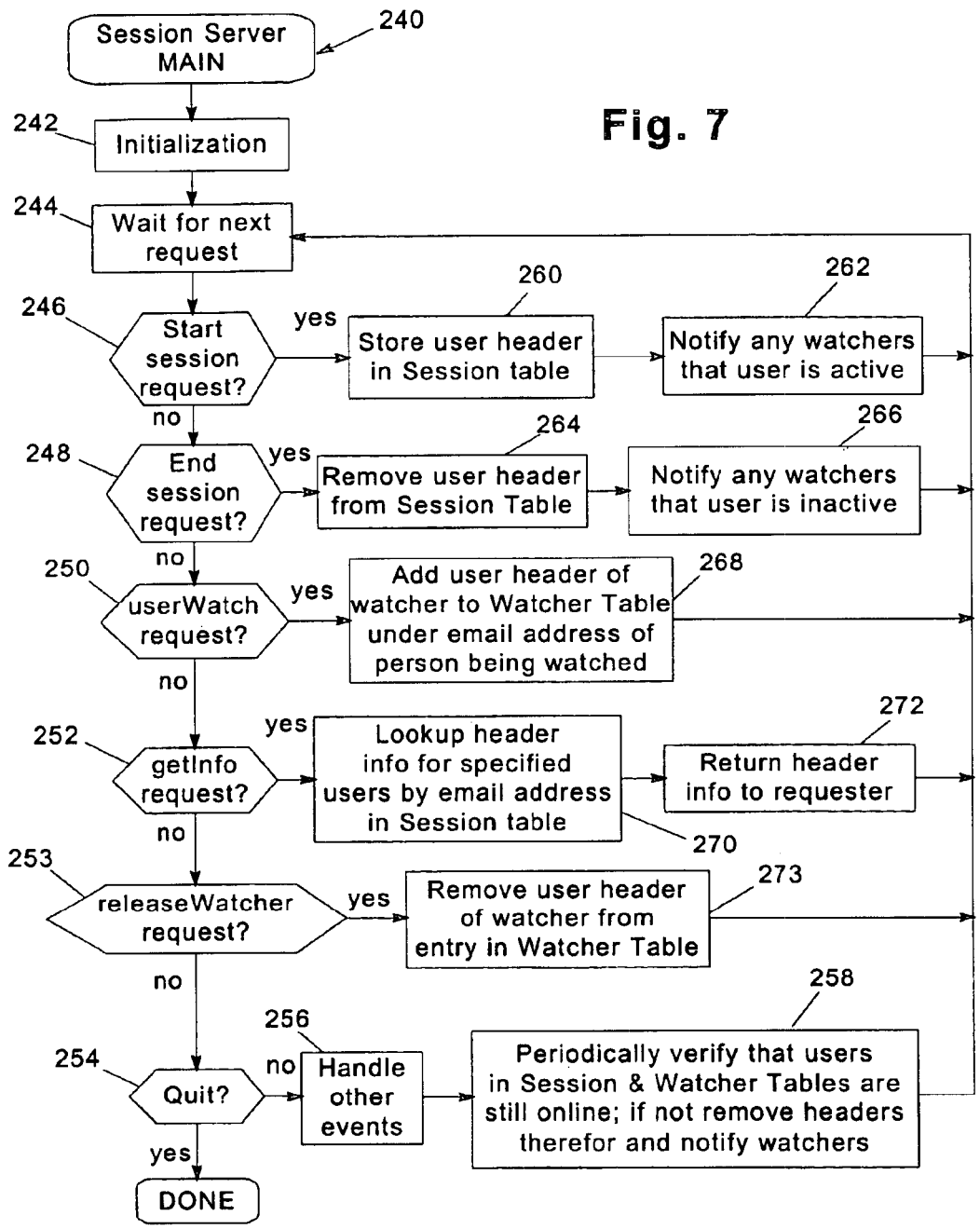
FIG. 7 is a flowchart illustrating the program flow of a main routine for the session server of FIG. 2.

FIGS. 4A and 4B illustrate a main routine 100 executed by a browser, while FIG. 6 illustrates an inquiry thread executed by each browser, and FIGS. 7 and 8 respectively illustrate main routines 240, 280 executed by a session server and a web server. In each routine, upon startup various initialization operations are executed, and then the routine enters an event-driven loop that repeatedly waits for events and handles those events as they are received.

As shown in FIG. 4A, for the browser, the initialization operations are represented in blocks 102–108, and the event-driven loop is initiated in block 110 by waiting for receipt of an event. As shown in FIG. 4B, various events are detected at blocks 112–128 and handled as appropriate, before returning control to block 110. Block 128 represents events that are conventionally handled by a browser, but which are not relevant to an understanding of the invention.

As shown in FIG. 7, for the session server, the initialization operation is represented in block 242, and the event-driven loop is initiated in block 244. Various events are detected at blocks 246–256, with block 254 representing a quit event that terminates the routine, and with block 256 representing conventional server events that are not relevant to an understanding of the invention. Also, as represented by block 258, from time to time the session server is required to periodically verify that users in the session and watcher tables are still online. Whenever any user in either table is no longer online, any user headers therefor are removed from the tables, and any watchers thereof are notified of the departure, in the manner discussed in greater detail below.

As shown in FIG. 8, for the web server, the initialization operation is represented in block 282, and the event-driven loop is initiated in block 284. Various events are detected at blocks 286–292, with block 291 representing a quit event that terminates the routine, and with block 292 representing conventional web server events that are not relevant to an understanding of the invention. Also, as represented by block 293, from time to time the web server is required to periodically verify that users in the active table are still online. Whenever any user is no longer online, all user headers for the user are removed from the table, other users are notified of the departure as appropriate, and any temporary favorite links registered by the user are removed, as discussed in greater detail below.

Returning now to FIG. 4A, for the browser, main routine 100 begins at block 102 by loading general information, favorite links, control options and other local configuration information for the browser, in particular for the current user of the browser. Among this information is a user header that provides identification information about the current user for the browser.

Next, in block 104, an inquiry thread is started for the current user. As will be discussed in greater detail below with respect to FIG. 6, the inquiry thread is used to return information about the current user in response to inquiry requests from other users in the multi-user computer environment. In the alternative, such requests may be handled by the browser itself, although by handling such requests in a different thread, such functionality is offloaded from the browser.

Next, in block 106, the browser sends a start session event to the home session server for the user to register an active session with the session server. The user header for the current user is forwarded with the event. Next, in block 108, additional browser startup operations, known in the art, are performed, and the event-driven loop is initiated by passing control to block 110.

The session server maintains an active/inactive status for each user for which the server is the home server. To maintain such status, the server typically receives status events, such as the start session event discussed above, from the browsers for which it is the home server. As shown in FIG. 7, a start session event is detected in block 246, and control passes to block 260 to store a user header forwarded with the event in the session table for the session server, using the email address in the user header as the index for a new entry in the table. Next, in block 262, any watchers for that user are notified that the user is inactive via an event to the inquiry thread of those watchers (discussed below with reference to FIG. 6). The watchers are identified by accessing the watcher table to locate an entry matching the email address of the new active user. Processing of the event is then complete.

Related to the start session request is an end session request, which is detected in block 248, and handled in blocks 264 and 266 by removing the user header from the session table, and notifying any watchers that the user is now inactive. An end session request is typically generated, for example, whenever the browser is closed by the user. Also, the event may be generated in block 258 whenever it is determined that a user has gone offline.

Tracking of where users are in a multi-user environment—that is, which users are currently viewing which documents—is handled principally by passing appropriate messages between the browsers and the web servers handling the various documents being viewed. In the illustrated embodiment, three events, identified as getPage, releasePage and swapPage, are used to implement this functionality.

As shown in FIG. 4B, the browser issues the getPage, releasePage and swapPage events in response to various events detected in blocks 112–116, identified as new URL, close URL and switch URL. The new URL event is detected in block 112 and handled in block 130 by passing a getPage event to the web server associated with a requested URL, passing that URL and the user header for the current user with the event. The new URL event is generally invoked whenever a user wishes to retrieve and view a document at a new URL, without discarding another document being viewed, e.g., during display of an initial home page upon startup of the browser, or when a new browser window is opened.

Turning to FIG. 8, the getPage event is detected by the web server at block 286, and handled via a get page routine 298, illustrated in greater detail in FIG. 9. Routine 298 begins in block 300 by getting the URL and user header from the request. Next, in block 302, the page contents of the document at the requested URL are retrieved, as is the linked list of user headers in the active user list for the requested URL. Next, in block 304, a reply is returned to the browser with the requested page information and active user list. Next, in block 306, the user header is added to the active user list for the URL, and in block 308, a notice is sent to the other active users in the active user list for the URL, via an add active user event (discussed in greater detail below). Routine 298 is then complete.

Returning to FIG. 4B, after the getPage event is passed in block 130, control passes to block 132 to receive the resulting page content and active user list from the web server. Next, in block 134, the browser page display is updated by rendering the returned page contents. Next, in block 136, the active user list displayed in the browser is updated to display identifiers for the active users of the new URL. Handling of the new URL event is then complete.

When displaying the users in the active user list, the users may be displayed in alphabetical order. In the alternative, the users may be categorized and ordered based upon any of the header information, or other profile information, for the users.

The close URL event is detected in block 114 and handled in block 138 by passing a releasePage event to the web server associated with the requested URL, passing the URL and the user header for the current user with the event. The close URL event is generally invoked whenever a user wishes to discard a document without replacing the document with another document, e.g., after closing the browser or a window in the browser.

Turning to FIG. 8, the releasePage event is detected by the web server at block 287, and handled via a release page routine 299, illustrated in greater detail in FIG. 10. Routine 299 begins in block 310 by getting the URL and user header from the request. Next, in block 312, the user header is removed from the active user list for the specified URL. Next, in block 314, a notice is sent to the other active users in the active user list for the URL, via a remove active user event (discussed in greater detail below). Routine 299 is then complete.

Returning to FIG. 4B, once the releasePage event is passed to the web server in block 138, control passes to block 139 to close the browser or browser window as appropriate. Processing of the event is complete.

The switch URL event is detected in block 116 handled by passing control to block 140. The switch URL event is generally invoked whenever a user wishes to discard a document at one URL and replace it with the document at another URL in the same browser window, e.g., when invoking a hypertext link, depressing a forward or back button, selecting a favorite link, etc.

Block 140 determines whether the old and new URL's specified in the event are located on the same web server. If so, control passes to block 142 to pass a swapPage event to the responsible server, specifying the old and new URL's and the user header for the current user. If not, however, blocks 144 and 146 are executed to respectively pass releasePage and getPage events to the responsible web servers for the old and new URL's, passing the appropriate URL and the user header in each instance.

The releasePage and getPage events are handled in the same manner discussed above by each web server. As shown in FIG. 8, the swapPage event is detected by the web server at block 288, and handled via sequentially calling get page and release page routines 298 and 299, which operate in the same manner as discussed above.

Returning to FIG. 4B, regardless of whether the URL's are on the same server, control ultimately passes to blocks 132–136 to retrieve the page contents and active user list for the new URL and display the contents and list to the user. Processing of the event is then complete.

As discussed above with respect to FIGS. 9 and 10, getting or releasing a URL by one user results in notifications being forwarded by the web server to the other users on the active user list of that URL. These notifications take the form of add active user and remove active user events, detected respectively by each browser at blocks 118 and 120 of FIG. 4B.

For the add active user event, block 118 passes control to block 148 to determine the URL and user from the event, and then to add the user header for that user to the active user list for the specified URL. Control then passes to block 136 to update the active user list display for the browser. Similarly, for the remove active user event, block 120 passes control to block 148 to determine the URL and user from the event, and then to remove the user header for that user from the active user list for the specified URL. Control also passes to block 136 to update the active user list display for the browser.

In the alternative, it may be desirable to provide a separate indication next to the identifiers for any users that have left the current hypertext document, so that the user knows that the users did visit the document, but are currently browsing elsewhere. In addition, it may be desirable to support a manual refresh operation, whereby a user may manually request that the status of each user in the active user list be updated.

In addition to being able to view the other users currently viewing a particular document, a user may also be permitted to track other users, e.g., via a saved user list stored locally in the browser for that user. The saved user list is typically a linked list of user headers of users that a particular user wishes to track. As will become apparent below, various information, e.g., online or active status, email address or other user header information may be retrieved and displayed for each user in the saved user list, so that the owner of the list can track such users.

A saved user list is opened in response to a show saved user list event detected at block 122. The event may be invoked in response to a user request, e.g., via a toolbar button or menu selection. The event may also be invoked during startup, e.g., if the user has set the list to be displayed as a default. In response to the event, control passes to block 152 to retrieve the list of saved user headers, and then pass userWatch and getInfo events to the session server for each user in the list, specifying both the user header of the current user and the user header for the saved user. Information about each user is returned in response to each getInfo event, and a window displaying such information is displayed in a window in the browser. Processing of the event is then complete.

When displaying a saved user list, the users may be displayed in alphabetical order, or in the order in which the users were added to the list. In the alternative, saved users may be categorized and ordered based upon any of the header information, or other profile information, about the users.

A related event, that of hiding the saved user list, is detected in block 124 and handled in block 154 by passing a releaseWatcher event to the session server for each user in the saved user list. The display window for the list is then removed.

The userWatch, getInfo and releaseWatcher events are respectively detected by blocks 250, 252 and 253 in FIG. 7. In response to a userWatch event, block 250 passes control to block 268 to add the user header of the new watcher to the watcher table, under the email address of the person to be watched. If no entry for such an email address exists, a new entry is created. Processing of the event is then complete.

In response to a getInfo event, block 252 passes control to block 270 to look up the current header information for the user or users specified in the event, typically by accessing the session table using the email address supplied with the event. The header information (including the current local port information therefor) is then returned in block 272. Processing of the event is then complete.

In response to a releaseWatcher event, block 253 passes control to block 273 to remove the user header supplied in the event from the watcher table. Processing of the event is then complete.

Returning again to FIG. 4B, with respect to users on either the current active user list or the saved user list for the browser, additional events may be detected related to other users in the environment, e.g., in response to user input directed to the display representations of the users in either of the lists. The user input may take any number of forms, e.g., clicking, double-clicking, right-clicking, etc. any of the display identifiers for such users, or in other manners known in the art such as menu or toolbar button selection, keystroke combinations, etc. Each of these operations with respect to other users of the environment are grouped together as user operations, and are detected by block 126 and handled by a process user operation routine 156.

Figure 5A:
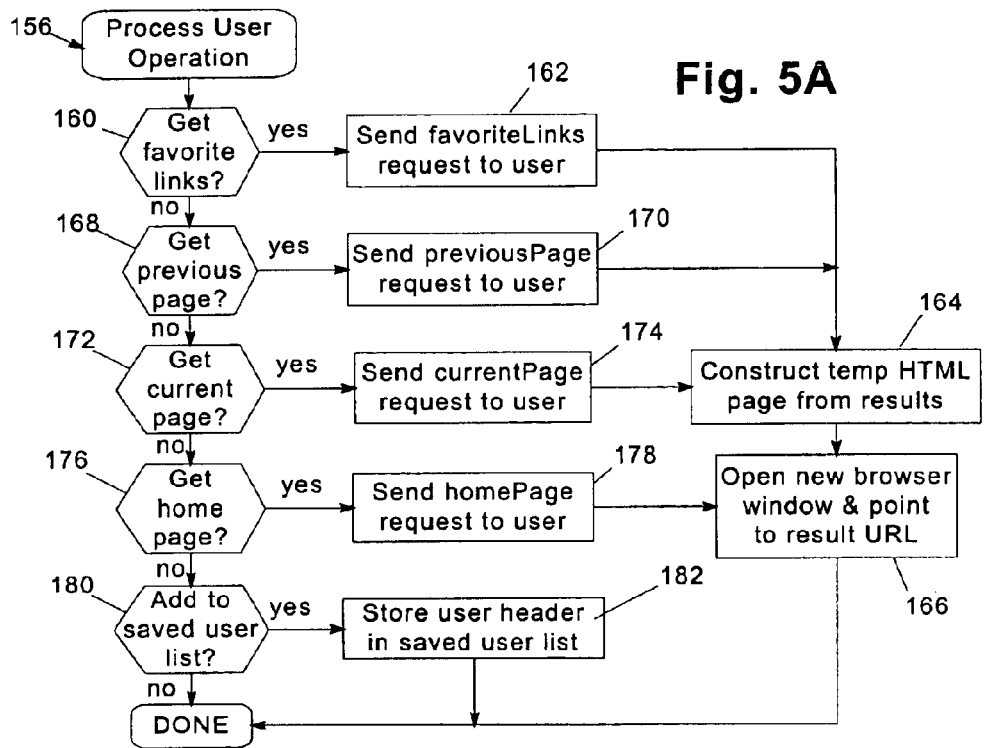

FIG. 5A illustrates routine 156 in greater detail. Routine 156 detects and handles a number of events directed to user operations. A predominant type of user operation is retrieval of information related to another user, whereby the user operation generally proceeds by passing an event directed to another user, which is forwarded either directly or via one or more of the session servers to the requested user. The requested user handles the event via the inquiry thread, thereby offloading the functionality from the user's browser. In the alternative, the browser may respond to such inquiries.

For example, block 160 detects a request by a user to retrieve favorite links associated with another user, and passes control to block 162 to send a favoriteLinks request event to the inquiry thread of the specified user. The favorite links may be associated with particular URL's, so that only favorite links related to the current page being viewed by the requesting user are displayed, and so the returned links are likely related to the currently-viewed page. In the alternative, the favorite links may not be associated with any particular URL's, so that all links for a particular user are returned regardless of the page the requesting user is viewing. The favorite links may be the same as the bookmark list stored locally in the user's browser, or may be maintained as a separate list by the browser and/or by the session server with which the browser is associated.

Furthermore, favorite links may be either permanent or temporary. A permanent favorite link for a user would typically be stored persistently in the client computer for the user, while a temporary favorite link would be discarded once the current browsing session for the user was terminated. It is also desirable to permit users to quickly tag hypertext documents that they are currently viewing for inclusion in their favorite links list, typically in much the sane manner as conventional bookmarks are created in conventional browsers.

Briefly deferring a detailed discussion of the inquiry thread, responsive to a favoriteLinks event, a responding inquiry thread returns the favorite links to the requesting user's browser. Control then passes from block 162 to block 164 to construct a temporary HTML document from the returned results, typically with any URL's in the returned results displayed and formatted as hypertext links. Next, block 166 opens a new browser window to display the temporary HTML document to the user. Processing of the event is then complete. It should be appreciated that other manners of displaying the results, e.g., via a pop-up window or dialog box, or within the same browser window, may also be used in the alternative.

Another type of information that can be requested about another user is a navigational history, representing one or more previous documents that a particular user has viewed. This type of information is requested via a get previous page event, which is detected in block 168 and handled by passing control to block 170 to send a previousPage request to the specified user. Control then passes to blocks 164 and 166 to format and display the results to the user.

Yet another type of information that can be requested about another user is what page or pages the user is currently accessing or viewing. When requesting this type of information, a get current page event is detected in block 172 and handled by passing control to block 174 to send a currentPage request to the specified user. Control then passes to blocks 164 and 166 to format and display the results.

An additional type of information that can be requested is the home page of another user, which is retrieved via a get home page event detected at block 176 and handled by passing control to block 178 to send a homePage request to the specified user. The requested user returns the URL of the home page for that user, and control passes to block 166 to open a new browser window to the returned URL.

Other information about a particular user may also be retrieved in different applications. For example, names, nicknames, addresses, phone numbers, interesting or personal information, etc. may also be returned via the same mechanism supported in the illustrated implementation.

Moreover, it should be appreciated that whenever the results of user operations such as requests for favorite links, current pages, home pages, or navigational histories are displayed, the requesting user may be permitted to navigate to any documents identified in those results, e.g., simply by clicking on any of the results.

Routine 156 also detects another type of event, that of manipulating the saved user list for the user. One such event is an add to saved user list event, which is detected in block 180 and handled in block 182 by storing the specified user header in the saved user list. It should be appreciated that other types of editing operations, e.g., removing or modifying entries in the saved user list, may also be supported.

The operation of an inquiry thread 200 for a user is illustrated in greater detail in FIG. 6. Routine 200 operates by waiting for inquiry requests in block 202 and handling any such requests as they are received. In response to a new request, control passes to block 204, which first determines whether a requesting user is authorized to receive information about the local user. If not, control passes to block 206 to return a request denied indication to the requesting user.

If authorized, control passes to block 208 to determine whether the request is a favoriteLinks request. If so, the relevant favorite links information is returned in block 210. If the request is a previousPage request, the request is detected in block 212 and handled by returning the requested navigational history information in block 214. If the request is a currentPage request, the request is detected in block 216 and handled by returning the requested current document in block 218. If the request is a homePage request, the request is detected in block 220 and handled by returning the URL of the user's home page in block 222.

An additional event handled by thread 200 is detecting a watched user state change, which is detected in block 224 and handled in block 226 by updating the user status in the saved user list window. Typically, this event occurs as a result of a notification from a session server that a particular user has initiated or terminated an active session with the server.

Yet another event handled by thread 200 is a quit event, which is detected in block 228 and handled by terminating the thread in response thereto. Otherwise, the thread runs continuously in the background in the client computer.

Returning again to FIG. 4B, another type of event that may be handled by the browser is a request to access or associate a favorite link with a particular hypertext document. Such an event is referred to herein as a page link operation event, which is detected in block 127 and handled via a process page favorite link routine 184. The event may be initiated, for example, in response to a menu or toolbar selection, for example.

A page favorite link is a particular link that a user has indicated to be related to a particular hypertext document that the user is viewing, permitting other users to access the link to view potentially relevant information. As will become apparent below, in the illustrated implementation, favorite links for each document are maintained in each web server, and the information is retrieved by passing an appropriate event to the server for the particular document for which favorite link information is desired. In the alternative, link information may be maintained in each session server, or within each browser, whereby the browser or session server would be required to poll each user for any favorite links that are registered or associated with a given URL.

One suitable implementation of routine 184 is illustrated in greater detail in FIG. 5B, beginning in block 186 by determining whether the event is a register new link event. This event, which a user invokes when it is desired to register a new link with a particular document being viewed, is performed, for example, by user selection of a menu or toolbar button. Receipt of such an event passes control to block 188 to request a URL and a permanent/temporary indication from the user, e.g., via a dialog box. The requested URL is the URL of the favorite link to associate with the current hypertext document. The temporary/permanent indication determines whether the link will be saved after the user ends his or her current browsing session. Once this information is retrieved, control passes to block 190 to pass a registerLink request to the web server for the current document, passing the user header and link information with the request.

As shown in FIG. 8, the web server detects the registerLink request in block 290 and passes control to block 296 to store the link URL, user header and permanent/temporary indication in a list of favorite links for the URL specified in the request. The favorite links list may use any suitable data structure. Handling of the request is then complete.

It should be appreciated that other manners of registering a favorite link may be used in the alternative. For example, a favorite link request may be made while a user is viewing a document that the user wishes to register as a favorite link for another document in such an instance, the user must be prompted for the document to associate the current document with, rather than the opposite mechanism discussed above. Otherwise, processing of the registration by the web server is substantially the same. In addition, it may also be desirable to automatically add related links as favorite links for a document, e.g., based upon categorization of the links within a bookmark folder structure for a user's browser. The categorization may be automated, e.g., as disclosed in U.S. patent application Ser. No. 08/978,126, filed by Bates et al. on Nov. 25, 1997, which is incorporated by reference herein. For example, a user might have a folder with several related links, whereby browsing to a particular document that is deemed to be related to those links would result in those links being automatically registered with the document. As another example, related links may be automatically registered with a document in response to a manual request to register any one of the related links with the document. Other modifications will be apparent to one of ordinary skill in the art.

Returning to FIG. 5B, another event is that of viewing the favorite links for a document, which is detected at block 192 and handled by passing control to block 194 to pass a getLinks request to the web server for the current document. Turning to FIG. 8, the getLinks request is detected in block 289 and handled in block 294 by returning the list of favorite links for the URL specified in the list. Returning again to FIG. 5B, the returned results are displayed to the user in block 196, whereby handling of the request is then complete. It should be appreciated that a user is typically permitted to select any of the favorite links to navigate to one of the links in the displayed list.

Figure 11:
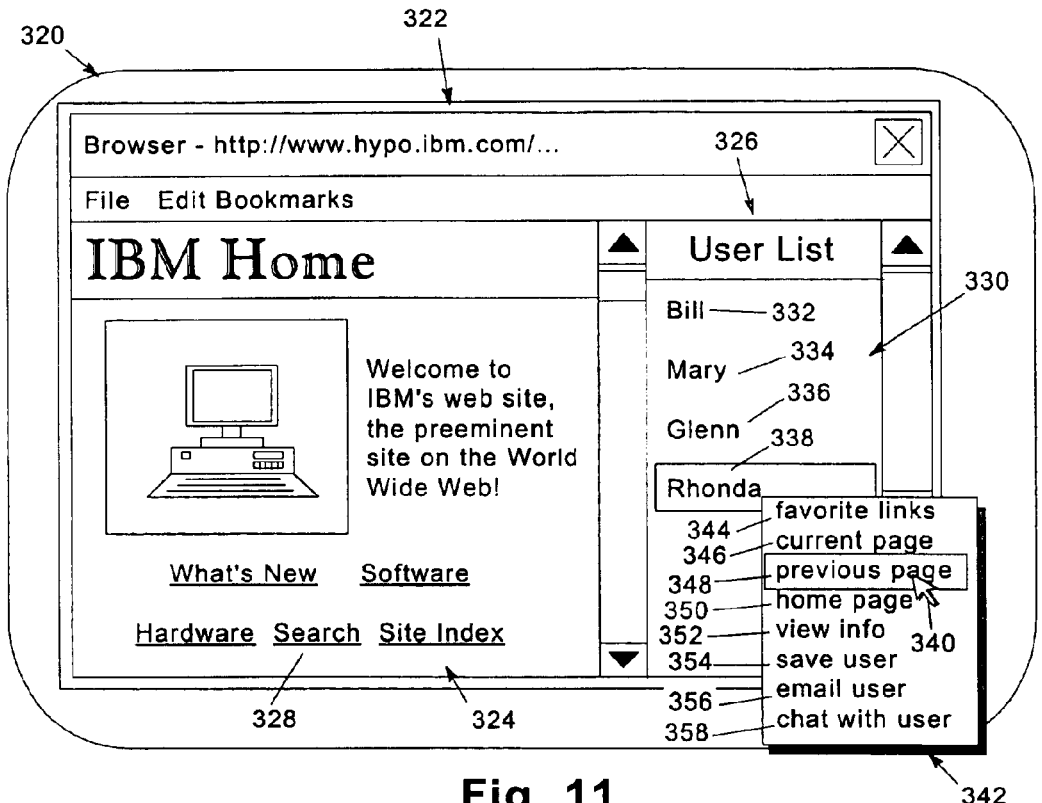
FIG. 11 is a block diagram of an exemplary computer display illustrating the operation of the browser of FIG. 2.

To further illustrate the operation of the illustrated multi-user computer environment, FIG. 11 shows a representative client computer display 320 within which is displayed a browser window 322. The browser window is partitioned into a two frames 324, 326. Within frame 324 is displayed a representative hypertext document 328. Within flame 326 is displayed a representative active user list 330, including display representations or identifiers 332, 334, 336 and 338 for a plurality of users currently viewing the same hypertext document.

FIG. 11 further illustrates the user selection of the display representation 338 of a user having a nickname of "Rhonda" by a user-manipulated pointer 340. In response to this selection, a pop-up menu 342 is displayed, offering the current user a list of possible menu selections, including favorite links selection 344, current page selection 346, previous page selection 348, home page selection 350, view info selection 352, save user selection 354, email user selection 356 and chat with user selection 358, that the user can select to perform various user operations. Selection 344 permits a user to retrieve the favorite links associated with Rhonda, while selection 346 permits the current page being viewed by Rhonda to be retrieved for the current user. Selections 348 and 350 respectively permit the navigational history and home page for Rhonda to be retrieved. Selection 352 permits other information associated with Rhonda, e.g., that available from the user header, to be retrieved. Selection 354 permits Rhonda to be added to the current user's saved user list.

Selection 356 permits the current user to send an electronic message to Rhonda, while selection 358 permits the current user to establish an online chat session with Rhonda. As to these latter two operations, it should be appreciated that the operations may be handled, for example, by opening a suitable email or chat client and following a conventional protocol for sending an email or establishing an online chat session, as appropriate. Other electronic communications mediums may also be used to permit users to communicate with one another while online.

Figure 12:
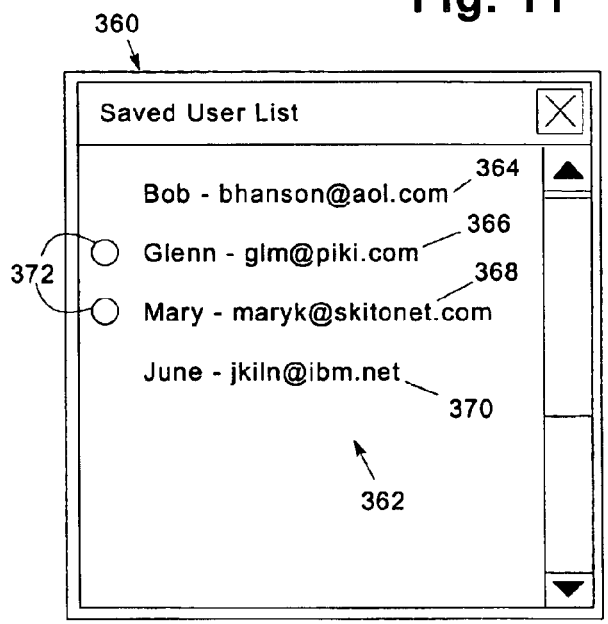
FIG. 12 is a block diagram of an exemplary dialog box for use in displaying a saved user list with the browser of FIG. 2.

FIG. 12 illustrates one suitable display representation for a saved user list, here implemented via a dialog box 360 within which is displayed a saved user list 362 including display representations or identifiers 364, 366, 368 and 370 of users stored in the lists. The identifiers may include any relevant information, here the nickname and email address of each user. Further illustrated are indicators 372 that may be displayed to represent that the users represented by identifiers 366 and 368 are currently active and online in the multi-user environment. Via separate pop-up menus or other user input mechanisms, additional information about each user may also be retrieved in the manner described herein.

Various modifications to the illustrated embodiments may be made without departing from the spirit and scope of the invention. For example, it may be desirable to permit users to view where other users have previously visited through providing unique indications on the display representations of hypertext links. Similar to the manner in which a user's own previously-viewed hypertext links may be displayed in a different color than other hypertext links, it may also be desirable, for example, to assign different colors to different users, and color hypertext links that have already been viewed by other users according to the colors associated with those users. In the alternative, other display indications, e.g., icons, pop-up menus, etc. may also used to indicate when another user has viewed a particular link.

To implement such an additional feature, it is desirable to periodically poll other users in the multi-user environment for their navigational history, e.g., via previousPage requests forwarded to the inquiry threads therefor. To limit the number of users tracked, it may be desirable to only track users in the saved user list, in the active user list for the document being displayed, or a custom list assembled by the current user. Moreover, it may be desirable to store the navigational history of each tracked user in a suitable data structure. In addition, a user may be permitted to manually assign colors to different users, and it is often desirable to display the identifications of the users being tracked in the color assigned thereto so that the current user can visually link the other users with the links they have visited before.

Figure 13:
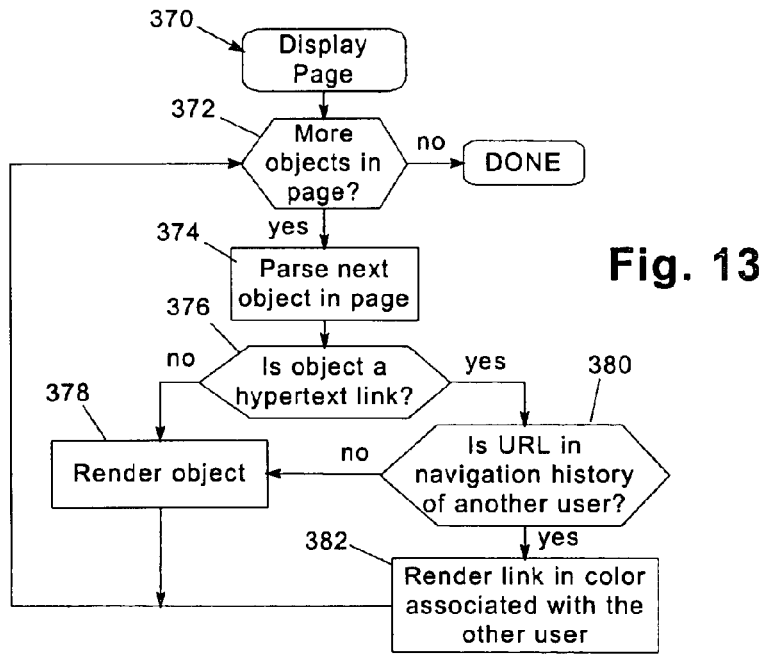
FIG. 13 is a flowchart of a display page routine executed by the browser of FIG. 2.

One suitable display page routine 370 for displaying a hypertext document such that the links therein are colored according to navigational history is illustrated in FIG. 13. Routine 370 executes a while loop starting at block 372, to process each object in the hypertext document being displayed until no unprocessed objects remain in the document. While additional unprocessed objects remain, the next object in the document is parsed and interpreted in block 374. Next, in block 376, it is determined whether the object is a hypertext link. If not, control passes to block 378 to render the object in a conventional manner. Control then returns to block 372 to process additional objects in the document.

Returning to block 376, if the object is a hypertext link, control passes to block 380 to determine whether the URL specified in the hypertext link is included in the navigational history of any tracked user. If not, control passes to block 378 to render the hypertext link in a conventional manner. If so, however, control passes to block 382 to render the hypertext link in the color associated with the other user that has previously viewed the URL for the link. Control then returns to block 372. Once all objects in the document have been processed, routine 370 is complete.

As another example, it may be desirable to extend the functionality of the favorite links retrieval operation to permit greater interactivity among users. For example, rather than retrieving the list of favorite links for a specific user, a current user may be able to retrieve into the same list all of the favorite links for all users on the active and/or saved user lists. The links in the cumulative list may be ordered alphabetically, by associated user, and/or by frequency of occurrence in the users' individual lists.

Figure 14:
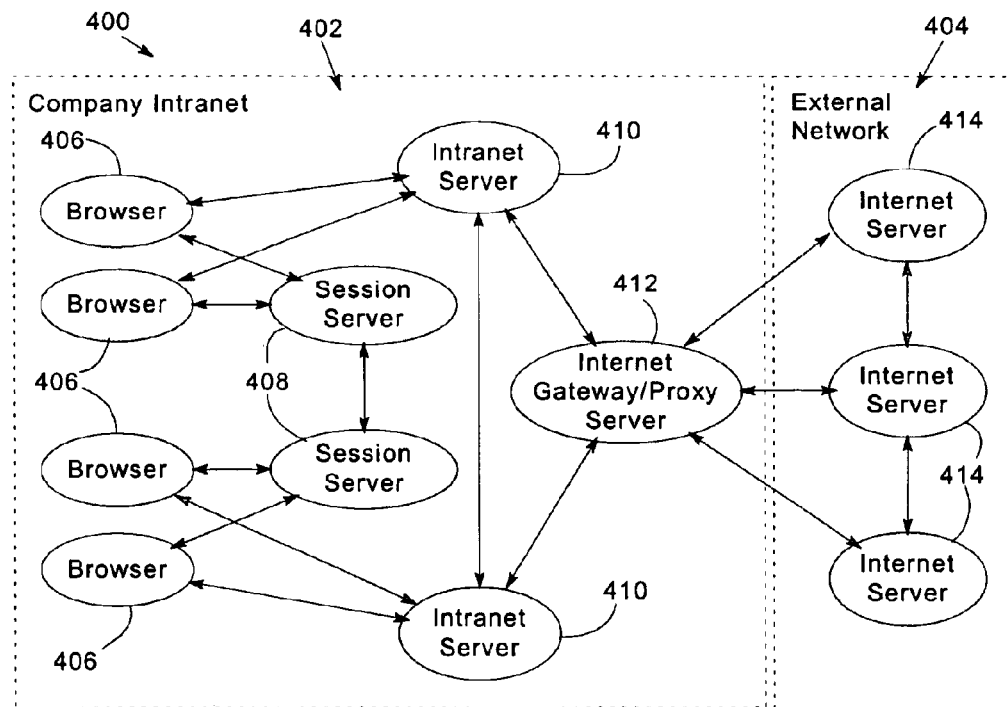
FIG. 14 is a block diagram of another exemplary hardware and software environment for the networked computer system of FIG. 1.

Also, as discussed above, it may be desirable in many applications to enable users to be tracked even when the users are viewing documents stored externally from a multi-user computer environment. FIG. 14 illustrates, for example, a computer environment 400 including a multi-user computer environment or data processing system 402 (e.g., a private networked computer system) coupled to an external network 404 (e.g., the Internet). Data processing system 402 includes a plurality of browsers 406 coupled to one or more session servers 408 consistent with the invention. The web serving functionality of the environment is handled via one or more internal servers (e.g., intranet servers 410), as well as one or more external gateway servers (e.g., Internet gateway/proxy server 412). The external network includes a plurality of Internet-based web servers 414, as is well known in the art.

In the implementation of FIG. 14, the locations of the different users in the environment are tracked in each of servers 410, 412 in the manner described above with respect to FIGS. 8–10. For server 412, the only difference in operation from the above-described web server implementations is that the retrieval of document/page contents (e.g., in block 302 of FIG. 9) is performed by retrieving a document from an external source, rather than from a local data storage device coupled to the server. The list of active users for that document, however, is still maintained local to the server. Consequently, tracking different users' locations on the Internet does not require that user tracking functionality be implemented in every server that a user accesses over the Internet—a functionality that would be difficult, if not impossible, to implement due to the amorphous nature of the Internet. In this manner, it can also be seen that the user tracking functionality of described herein need not be implemented on every internal web server consistent with the invention. Rather, so long as at least one web server is tracking the accesses to the other internal web servers, the tracking functionality can be centralized to a fewer number of servers than may actually exist on an internal network.

Other modifications will be apparent to one of ordinary skill in the art. Therefore, the invention lies in the claims hereinafter appended.

What is claimed is:

1. A method of providing access to hypertext documents in a multi-user computer environment, the method comprising:
   (a) tracking accesses to a plurality of preexisting hypertext documents by a plurality of users;
   (b) notifying a first user that is currently accessing one of the plurality of preexisting hypertext documents of the identity of a second user that is accessing the same hypertext document;
   (c) associating a second hypertext document with the second user in response to user input from the second user; and
   (d) notifying the first user of the association of the second hypertext document with the second user;
wherein associating the second hypertext document with the second user includes storing an identifier for the second hypertext document in a list of favorite links associated with the second user, wherein notifying the first user of the association of the second hypertext document with the second user includes displaying the list of favorite links to the first user, and wherein the method further comprises building a list of favorite links associated with the hypertext document being viewed by the first user by combining lists of favorite links associated with only those users currently viewing the same hypertext document as the first user.

2. An apparatus, comprising:
   (a) a memory; and
   (b) a program, resident in the memory, the program configured to track accesses to a plurality of preexisting documents by a plurality of users, to notify a first user among the plurality of users that is currently accessing one of the plurality of preexisting hypertext documents of the identity of a second user among the plurality of users that is accessing the same hypertext document, and to maintain on behalf of the first user a user-editable saved user list that identifies at least the second user such that the first user is notified of the identify of any user in the user-editable saved user list that is accessing the same hypertext document, wherein the program is configured to maintain the user-editable saved user list by performing at least one of adding a third user to the user-editable saved user list and removing the second user from the user-editable saved user list in response to user input received from the first user;
wherein the program is further configured to associate a second hypertext document with the second user in response to user input from the second user, and to notify the first user of the association of the second hypertext document with the second user, and wherein the program is further configured to build a list of favorite links associated with the hypertext document being viewed by the first user by combining lists of favorite links associated with each user currently viewing the same hypertext document as the first user.

3. The method of claim 1, further comprising maintaining on behalf of the first user a user-editable saved user list that identifies at least the second user such that the first user is notified of the identity of any user in the user-editable saved user list that is accessing the same hypertext document, wherein maintaining the user-editable saved user list includes at least one of adding a third user to the user-editable saved user list and removing the second user from the user-editable saved list in response to user input received form the first user.

4. The method of claim 1, wherein tracking accesses to the plurality of preexisting hypertext document includes maintaining a list of users that access each hypertext document, and wherein notifying the first user includes notifying the first user of the identity of each user in the list of users.

5. The method of claim 4, wherein notifying the first user of the identity of each user in the list of users includes displaying the list of users to the first user.

6. The method of claim 4, wherein notifying the first user of the identify of each user in the list of users includes separately notifying the first user of each user from the list of users that is no longer accessing the hypertext document.

7. The method of claim 4, wherein tracking accesses to the hypertext document further includes removing from the list of users a user that is no longer accessing the hypertext document.

8. The method of claim 1, wherein the second user has a home hypertext document associated therewith, the method further comprising communicating to the first user a copy of the home hypertext document associated with the second user in response to user input from the first user.

9. The method of claim 1, wherein tracking accesses to the hypertext document further includes maintaining a navigation history for the second user, the nagivation history including a set of hypertext documents previously accessed by the second user, and wherein the method further comprises notifying the first user of the set of hypertext documents in the navigation history for the second user.

10. The method of claim 1, wherein tracking accesses to the hypertext document further includes maintaining a navigation history for the second user, the navigation history including a set of hypertext documents previously accessed by the second user, and wherein the method further comprises displaying a first hypertext document to the first user, the first hypertext document including a hypertext link to a second hypertext document that is in the navigation history for the second user, wherein displaying the first hypertext document includes display withing the first hypertext document and in association with the hypertext link an indication that the second hypertext document is in the navigation history for the second user.

11. The method of claim 10, wherein displaying the indication includes displaying the hypertext link to the second hypertext document in a color associated with the second user.

12. The method of claim 1, wherein notifying the first user of the identity of the second user includes notifying the first user of whether the second user is currently active in the multi-user computer environment.

13. The method of claim 12, further comprising performing a predetermined list management operation on the user list in response to user input from the first user, the predetermined list management operation selected from the group consisting of sending a message to a user in the user list, navigating to a hypertext document currently being viewed by a user from the user list, and navigating to a home hypertext document for a user from the user list.

14. The method of claim 1, further comprising communicating the second hypertext document to the first user in response to user input from the first user.

15. The method of claim 1, wherein displaying the list of favorite links is performed responsive to user input received from the first user while the first and second users are currently viewing the same hypertext document.

16. The method of claim 1, further comprising:

(a) associating a second hypertext document with a first hypertext document in response to user input from the second user; and (b) notifying the first user of the association of the second hypertext document with the first hypertext document.

17. The method of claim 16, wherein associating the second hypertext document with the ifrst hypertext document includes temporarily associating the second hypertext document with the first hypertext document such that the association therebetween is discarded whenever the second user is not active in the multi-user computer-environment.

18. The method of claim 1, wherein tracking accesses to the plurality of preexisting hypertext documents is performed in a first computer, and wherein at least a portion of the plurality of preexisting hypertext documents are stored externally from the multi-user computer environment.

19. The apparatus of claim 2, wherein the program is further configured to maintain a list of users that access each hypertext document, and to notify the first user of the identity of each user in the list of users.

20. The apparatus of claim 2, wherein the second user has a home hypertext document associated therewith, the program further configured to communicate to the first user a copy of the home hypertext document associated with the second user in response to user input form the first user.

21. The apparatus of claim 2, wherein the program is further configured to retrieve a navigation history for the second user, the navigation history including a set of hypertext documents previously accessed by the second user.

22. the apparatus of claim 21, wherein the memory is disposed in a server computer, the apparatus further comprising a client computer coupled to the server computer, the client computer including a second memory and a second program resident in the second memor, the second program configured to display a first hypertext document to the first user, the first hypertext document including a hypertext link to a second hypertext document that is in the navigation history for the second user, the second program further configured to display within the first hypertext document an indication that the second hypertext document is in the navigation history for the second user.

23. The apparatus of claim 2, wherein the program is further configured to associate a second hypertext document with the second user in response to user input from the second user; and to notify the first user of the association of the second hypertext document with the second user.

24. The apparatus of claim 23, wherein the program is further configured to store an identifier for the second hypertext document in a list of a favorite links associated with the second user.

25. The apparatus of claim 2, wherein the program is further configured to associate a second hypertext document with a first hypertext document in response to user input from the second user, and to notify the first user of the assciation of the second hypertext document with the first hypertext document.

26. The apparatus of claim 25, wherein the program is further configured to temporarily associate the second hypertext document with the first hypertext document such that the association therebetween is discarded whenever the second user is no active.

27. The apparatus of claim 2, further comprising a first computer within which the memory is disposed, wherein the program is configured to retrieve at least a portion of the plurality of preexisting hypertext documents from a second computer remote from the first computer and external from the apparatus.

28. The apparatus of claim 27, wherein the second computer is coupled to the first computer over the Internet.

* * * * *